United States Patent [19]
Wettstein

[11] Patent Number: 5,697,209
[45] Date of Patent: Dec. 16, 1997

[54] POWER PLANT WITH STEAM INJECTION

[75] Inventor: Hans Wettstein, Fislisbach, Switzerland

[73] Assignee: Asea Brown Boveri AG, Baden, Switzerland

[21] Appl. No.: 552,957

[22] Filed: Nov. 3, 1995

[30] Foreign Application Priority Data

Dec. 24, 1994 [DE] Germany .................. 44 46 543.2

[51] Int. Cl.$^6$ ............................................... F02C 7/00
[52] U.S. Cl. ..................... 60/39.53; 60/39.59; 60/751; 415/116
[58] Field of Search ................. 60/39.05, 39.3, 60/39.53, 39.59, 751; 415/116

[56] References Cited

U.S. PATENT DOCUMENTS

| | | | |
|---|---|---|---|
| 3,280,555 | 10/1966 | Charpentier et al. | 60/39.53 |
| 5,054,279 | 10/1991 | Hines | 60/39.53 |
| 5,255,505 | 10/1993 | Cloyd et al. | 60/39.53 |
| 5,557,921 | 9/1996 | Frutschi et al. | 60/39.53 |

FOREIGN PATENT DOCUMENTS

0462458A1 12/1991 European Pat. Off. .
1197280  7/1965 Germany .

OTHER PUBLICATIONS

"Combustion Device for Gas Turbine", Minagawa, Pat. No. 55–82229 (Jun. 1980), Patents of Japan, vol. 4, No. 125, Sep. 1980.

*Primary Examiner*—Charles G. Freay
*Attorney, Agent, or Firm*—Burns, Doane, Swecker & Mathis, L.L.P.

[57] ABSTRACT

In a power plant which essentially comprises a compressor (2), a combustion chamber (4) and a turbine (7), an injector system (30) is provided in the region of an outlet diffuser (3) of the compressor (2). This injector system (30) comprises a ring of individual injectors (31) which are arranged on the inner circumference of the outlet diffuser (3). The propulsion nozzles of these injectors (31) are loaded with steam (10) from a waste-heat steam generator (9). The throughflow cross section of the outlet diffuser (3) at the same time forms the combining nozzle of the injectors (31).

3 Claims, 4 Drawing Sheets

POWER PLANT WITH STEAM INJECTION

BACKGROUND OF THE INVENTION

1. Field of the Invention

The present invention relates to a power plant with an injector system.

2. Discussion of Background

The ultimate aim in the implementation of improvements in power plants is always to minimize the emissions of harmful substances arising from combustion and to maximise the efficiency of the plant. In this regard, attention is drawn to the gas turbine groups of the latest generation which can furnish efficiencies of more than 35%. These so-called combination plants constitute a further refined technique in power plants. This designation refers to the operative interaction of a gas turbine group with at least one downstream steam circuit, the exhaust gases from the gas turbine process, which still have a relatively high energy potential, being guided into a waste-heat steam generator, in which the generation of the steam necessary for loading a steam turbine takes place. Such a waste-heat steam generator can be a single-pressure or mixed-pressure appliance. It is possible, furthermore, to equip the waste-heat steam generator with additional firing. According to the current state of the art, such a plant can furnish efficiencies of well above 55%. It is obvious that efforts are aimed at further developing these fossil-fired power plants, firstly with a view to achieving a better utilization of the fossil reserves and secondly because, viewed from the predetermined platform, any technological advance makes a difference out of all proportion on account of the leverage which occurs. In the case of gas turbine groups, an appreciable fraction of the turbine power has to be expended in order to drive the compressor, so that an increase in the pressure gradient in the gas turbine, leading per se to a higher efficiency of the plant, is to be achieved by a higher compression of the process air in the compressor, consequently affording little to nothing in the balance, so the positive output of the turbine is lost in the form of increased shaft power consumption by the compressor.

A method for increasing the compressor-related pressure gradient of the gas turbine of a power plant, in which the circuit comprises a gas turbine group and a downstream waste-heat steam generator, has become known. An injector, through the combining nozzle of which the air precompressed in the compressor flows, acts immediately upstream of the combustion chamber. The propulsion nozzle of this injector is loaded by at least some of the steam occurring in the waste-heat steam generator, with the result that the compressor air is further compressed, this being achieved without picking up any element of the power of the gas turbine. This alignment results per se in an improvement in efficiency, but it must be said that such a technique presents problems, since the air supply from the compressor via a downstream injector system entails, in flow terms, costly and not always optimum configurations.

SUMMARY OF THE INVENTION

Accordingly, one object of the invention is to remedy this. The object on which the invention, as defined in the claims, is based is, in a power plant of the type initially mentioned, to propose an injector system which, along with maximized efficiency, necessitates a minimized plant-related extension of the gas turbine group.

The essential advantage of the invention is to be seen in that the injector system is integrated into the narrower and wider region of the compressor and outlet diffuser which are present in any case, with the result that the receiving nozzle of the injector is directly connected operatively to the air flow in the compressor or downstream of the latter, so that the implementation of such an injector system makes do without additional constructional measures.

In operational terms, such a configuration affords the advantage that, with an increasing steam flow rate via the propulsion nozzle, the pressure upstream of the turbine rises, without the counterpressure in the compressor assuming inadmissible values, in such a way that a sufficiently large pumping margin remains guaranteed in the compressor.

Further advantages of the invention are to be seen in that the integration of the injector system into the compressor or into its outlet diffuser can be carried out in an existing single-shaft or multi-shaft gas turbine group, such an extension still also always improving the velocity distribution and therefore the pressure recovery in the outlet diffuser.

If the outlet diffuser is widened in the region of the introduction of the steam for operating the injector, this avoids the occurrence of excessive velocities and thus allows the steam secondary expansion, if it emerges at sound velocity and with residual overpressure.

A further essential advantage of the invention is to be seen in that the injector can be arranged at the end of the compressor, in the region of or within the outlet guide vanes. The outlet guide vanes allow a fine distribution at a high outlet velocity of the sprayed-in steam in the annular cross section, thereby improving momentum exchange and pressure gain.

Furthermore, it should not be forgotten that, with the proposed invention, it is, in general, possible to operate with a higher injection pressure.

Advantageous and expedient developments of the solution according to the invention for achieving the object are defined in the further claims.

Exemplary embodiments of the invention are represented and explained in more detail below by means of the drawings. All elements not necessary for a direct understanding of the invention are omitted. The direction of flow of the various media is indicated by arrows. Like elements are provided with the same reference symbols in the various figures.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
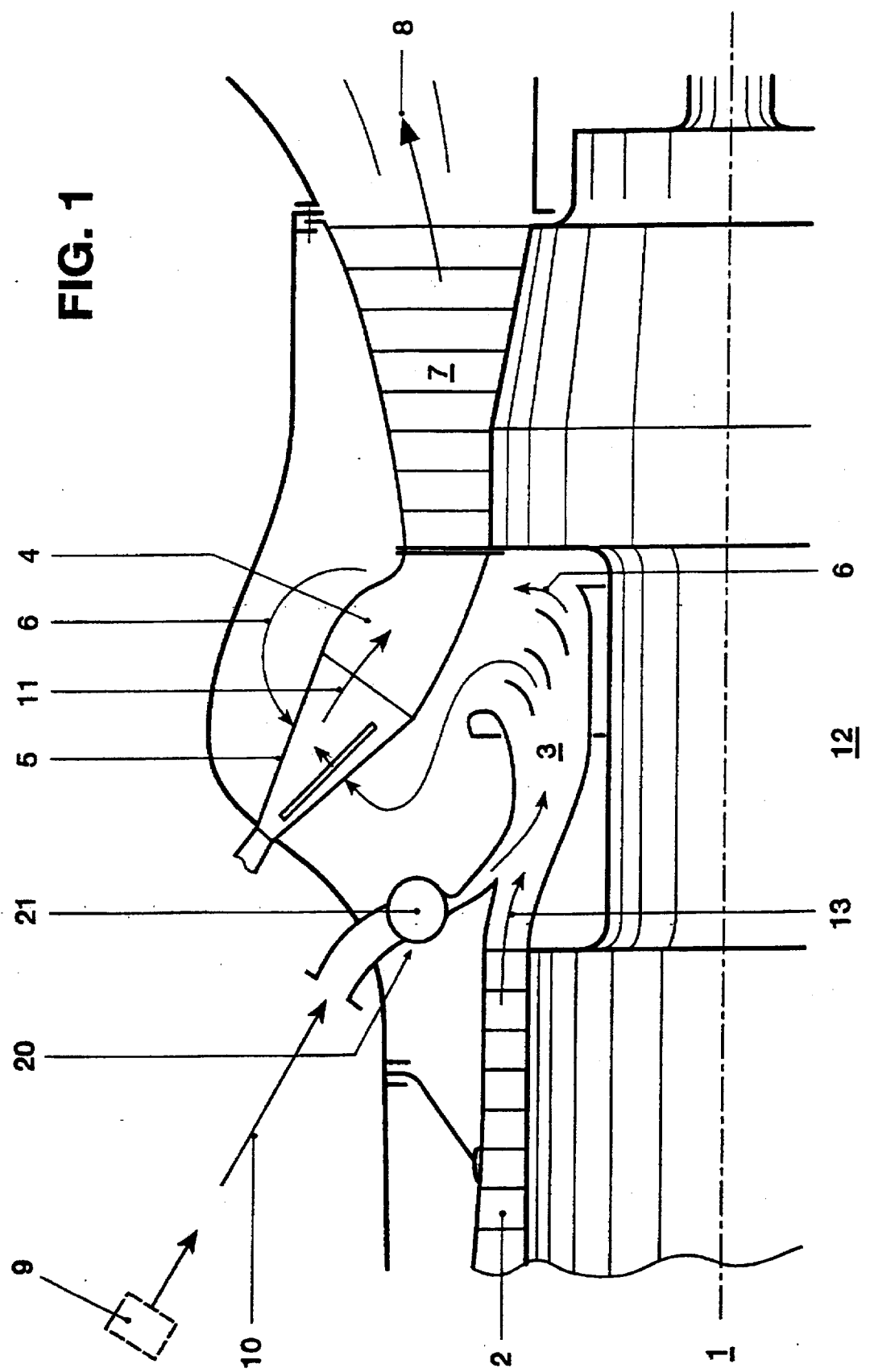
FIG. 1 shows a part view of a gas turbine group with an injector, the propulsion nozzle of which is arranged on the outer circumference of the outlet diffuser.

Referring now to the drawings, wherein like reference numerals designate identical or corresponding parts throughout the several views, FIG. 1 shows, in a gas turbine group including a generator 1, a compressor 2, a combustion chamber 4 and a turbine 7, and an injector system 20 which acts directly downstream of the compressor 2, that is to say in the region of an outlet diffuser 3. As the figure shows, both the compressor 2 and the turbine 7 are mounted on a common shaft 12. Directly downstream of the compressor 2, within the outlet diffuser 3 adjacent there, the precompressed air 13 is further compressed as a result of the action of the injector system 20. High-pressure steam 10 generated, for example, in a waste-heat steam generator 9 loads the propulsion nozzle of this injector system 20 and ensures that the precompressed air 13 from the compressor 2 is further compressed, the outlet diffuser 3 acting here as a receiving nozzle of the injector system 20. The subsequent combustion is thereby carried out at a higher pressure level. Specifically, the ready-compressed air 6 flows via at least one burner 5 into a combustion chamber 4 which preferably has the form of an annular combustion chamber and in which hot gases 11 are supplied. If the combustion chamber 4 is designed as an annular combustion chamber, a plurality of burners are arranged on the head side and about the circumference of the annular combustion chamber, these burners preferably being premixing burners according to U.S. Pat. No. 4,932,861 to Keller et al., the statements made in this publication being an integral part of this description. In such an annular combustion chamber, the injector system 20 comprises a closed ring of injectors 21 which are arranged externally and concentrically to the outlet diffuser 3. The hot gases 11 prepared in said combustion chamber 4 load the downstream turbine 7. The exhaust gases 8 from the turbine 7 are fed to the waste-heat steam generator 9, where their energy is further utilized. In a high-pressure part of the waste-heat steam generator 9, high-pressure steam 10 is generated from the released thermal energy from these exhaust gases 8 and is guided, for example via a ring conduit not shown, to the individual injectors 21 and there in each case loads the corresponding propulsion nozzle. The steam used for the injector system 20 does not necessarily have to originate from the waste-heat steam generator. As soon as steam of sufficient quality is present, it can be used without further action for operating the injector system 20. In operational terms, the effect of the injector system 20 affords the advantage that, with increasing steam 10, the pressure upstream of the turbine 7 rises, without the counter pressure in the compressor 2 increasing inadmissibly. The injector system 20 described here can be incorporated extremely easily into an existing single-shaft or multi-shaft gas turbine group.

It is, of course, possible, furthermore, also to introduce a steam quantity via injectors for other purposes, for example as a coolant for the thermally stressed assemblies of the gas turbine group or for increasing the mass flow or as an admixing medium for a fuel. In the case of steam injection into the annular gap of the rotor cooling-air feed, this takes place preferably in the axial or obliquely axial direction. This allows for treatment of the supply of cooling air to the rotor in respect of pressure and temperature corresponding to the higher pressure of the main flow. In the gap region bounded by the rotor and stator, the tangential component of the steam sprayed in via the injectors can be utilized to maintain or increase the swirl in the direction of rotation, with the result that the losses attributable to friction in this region are reduced or even converted into useful propulsive power. It is, of course, possible, here, to bring about the introduction of steam via moving blades of the rotor.

Figure 2:
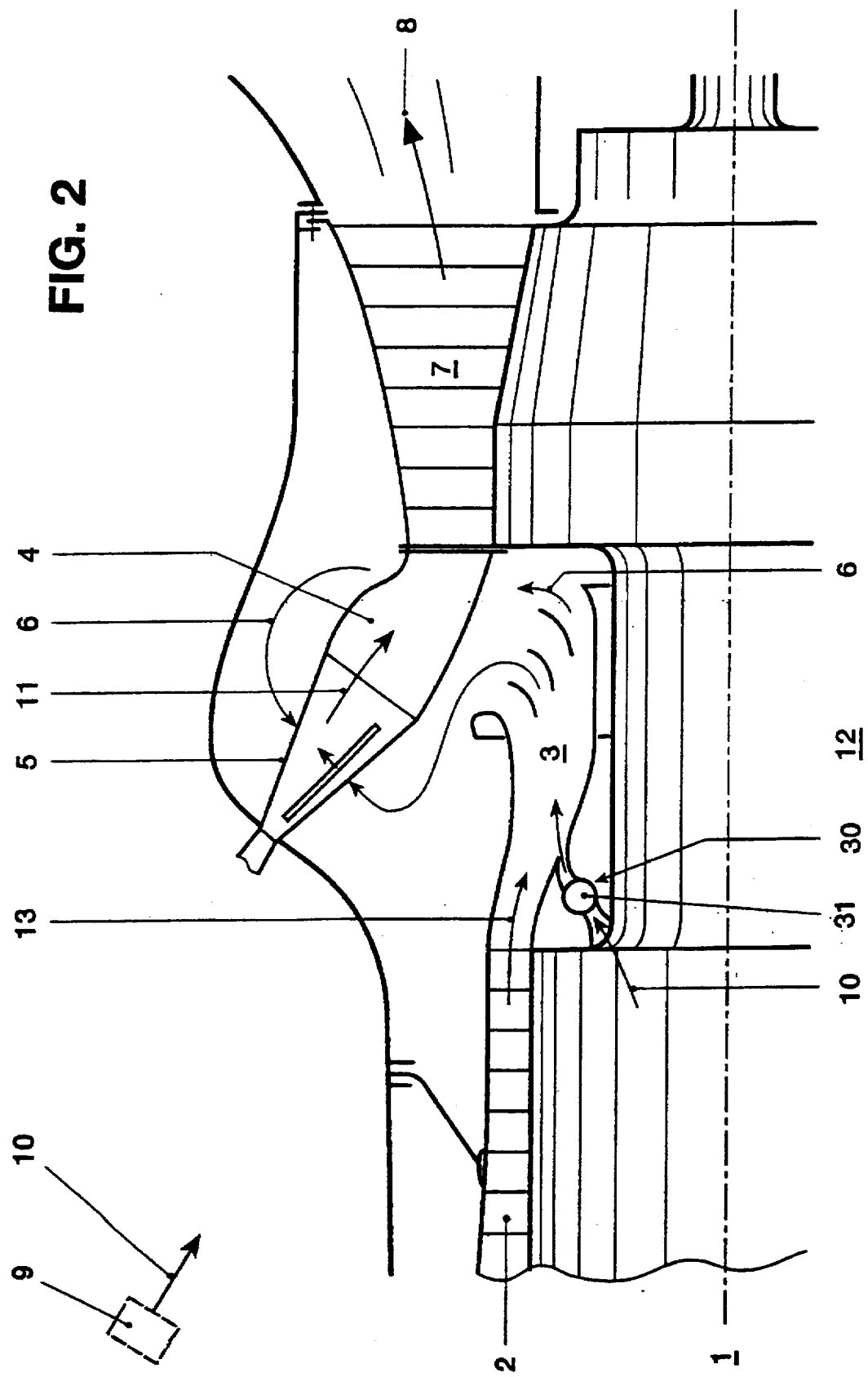
FIG. 2 shows a part view of a gas turbine group with an injector, the propulsion nozzle of which is arranged on the inner circumference of the outlet diffuser.

FIG. 2 shows a construction similar to that in FIG. 1, here too the injector system 30 comprising a closed ring of injectors 31 which, however, are arranged internally and concentrically to the outlet diffuser 3. Their mode of operation is nevertheless fundamentally the same.

The two versions according to FIGS. 1 and 2 can be combined without further action. In such a combination, the individual injectors could be arranged in such a way that the steam inlet points into the outlet to bring about an acceleration of the near-wall boundary layers, thus resulting in a reduction in the blockage factor, an improvement in the velocity distribution in the outlet diffuser itself and a marked pressure recovery. The two figures indicate, furthermore, that the aim is to achieve a widening in cross section at the points where the steam is sprayed into the outlet diffuser. This measure avoids an excessive velocity and allows the steam secondary expansion if it emerges at sound velocity and with residual overpressure. Downstream of this widening in cross section, the adjacent mixing zone can be designed with a constant or only slightly increasing cross section, with the result that the momentum exchange necessary for the pressure rise can be achieved.

Figure 3:
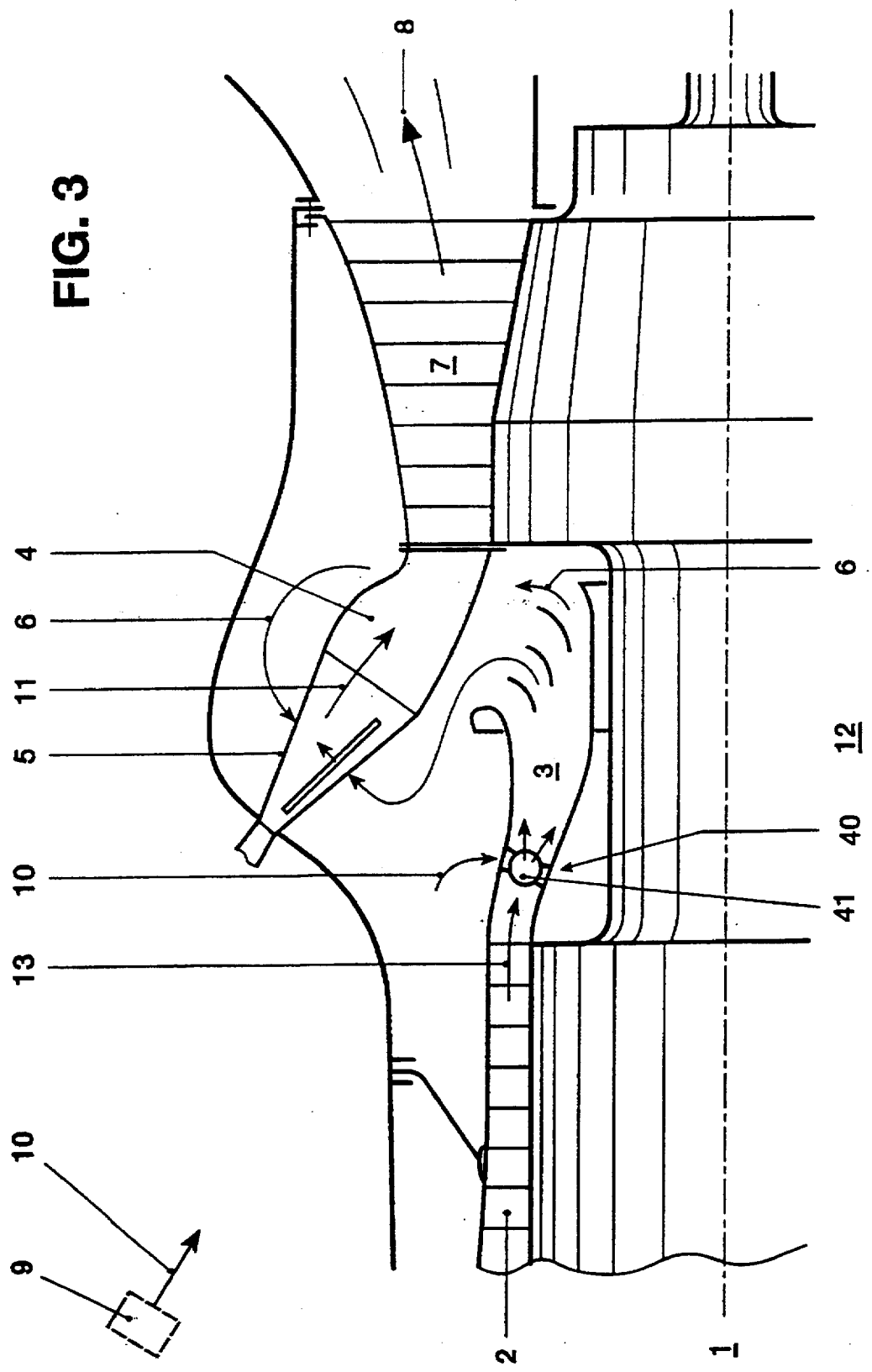
FIG. 3 shows a part view of a gas turbine group with an injector, the propulsion nozzle of which is arranged in the flow cross section of the outlet diffuser.

FIG. 3 shows the arrangement of an injector system 40 within the throughflow cross section of the outlet diffuser 3. This injector system 40 likewise comprises a closed ring of individual injectors 41 which are multi-jet in each case. In this version, it is possible to accelerate the near-wall boundary layers within the outlet diffuser 3 in a more controlled manner.

Figure 4:
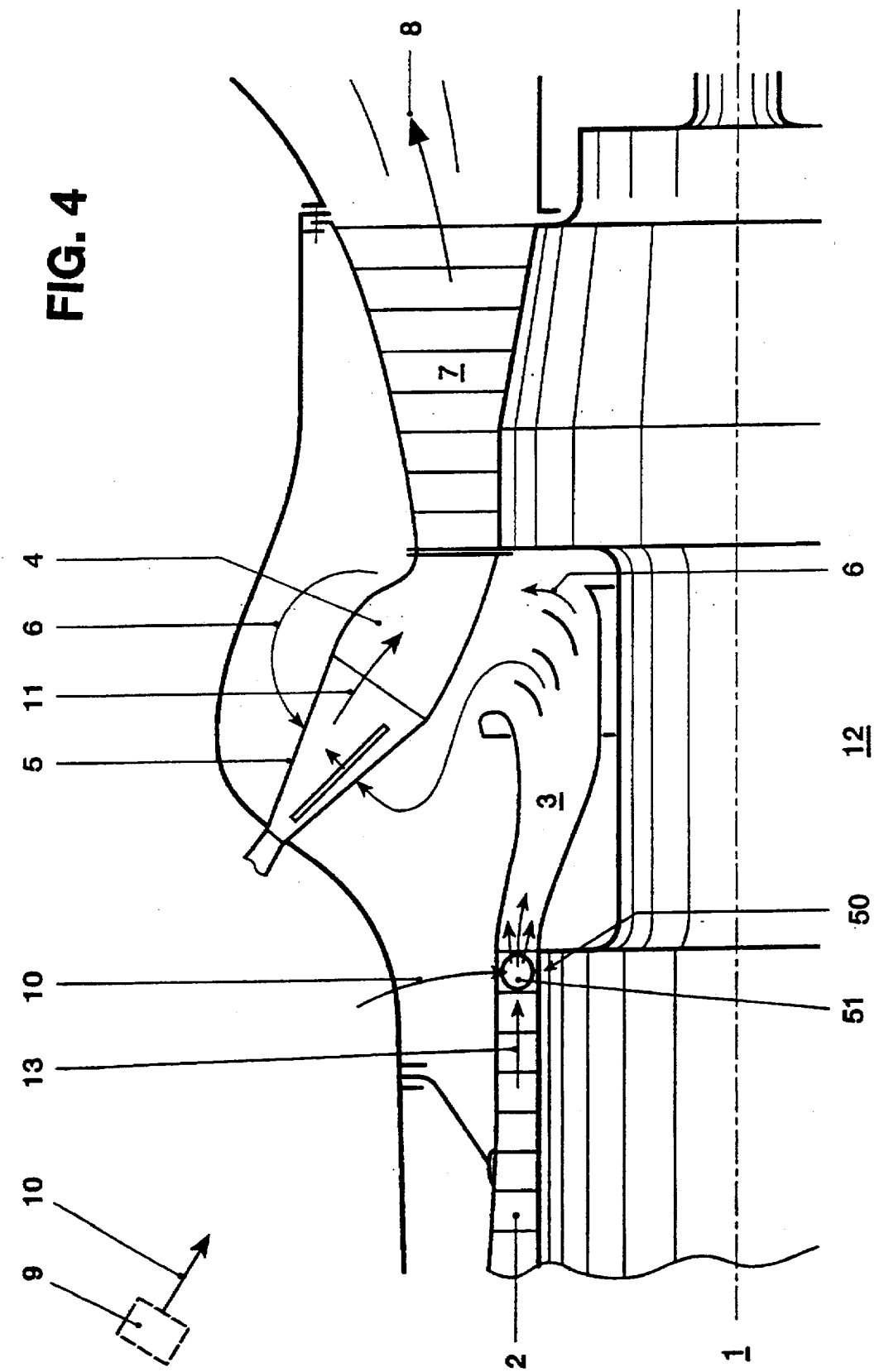
FIG. 4 shows a part view of a gas turbine group with an injector, the propulsion nozzle of which is arranged in the region of the outlet guide vanes of the compressor or is part of these outlet guide vanes.

FIG. 4 shows a further design version, in which an injector system 50, likewise comprising of a closed ring of individual injectors 51, is arranged in the region of the outlet guide vanes of the compressor 2. In such a configuration, the steam 10 can be sprayed in very effectively at high velocity by the trailing edge of the outlet guide vanes. At the same time, the radial or quasi-radial steam flow distribution can be designed in such a way that it generates a velocity profile favorable for pressure recovery. Here too, a radial widening in cross section at the steam inlet point is advantageous. In general, the outlet guide vanes permit a fine distribution of the steam 10 in the annular cross section, thereby resulting in an improvement in the momentum exchange and consequently the pressure gain. At all events, the outlet of the steam at high velocity via the outlet guide vanes can be improved by incorporating separate outlet bodies, but in that case the flow of the precompressed air 13 must be taken into account.

It can be said, in general, that the injector pressure is selected in the range of double the compressor pressure, with the result that the waste-heat steam generator can be operated with a large temperature difference, thus entailing a reduction in the exchange area. By means of the described introduction of steam via injectors, load regulation at a high part-load efficiency can also be carried out in another way, in that, starting from the rated load, preferably first the mass air flow, only then the steam flow and lastly the turbine inlet temperature are lowered. In contrast, if action is first taken on the steam flow, the reduced steam flow has a higher temperature; however, this allows the additionally reduced mass air flow to make it possible to maintain the firing temperature.

Obviously, numerous modifications and variations of the present invention are possible in the light of the above teachings. It is therefore to be understood that, within the scope of the appended claims, the invention may be practiced otherwise than as specifically described herein.

What is claimed as new and desired to be secured by Letters patent of the United States is:

1. A power plant comprising at least one compressor, at least one combustion chamber operable with at least one burner, at least one turbine connected downstream of the combustion chamber, and at least one injector system having a plurality of nozzles which are operable with steam, wherein the injector system is connected to inject steam through outlet guide vanes of the compressor into an outlet diffuser connected downstream of the compressor to further compress air directed into the outlet diffuser from the compressor, wherein the nozzles of the injector system are disposed concentric to the outlet diffuser, and wherein the outlet diffuser forms a receiving nozzle of the injector system.

2. The power plant as claimed in claim 1, wherein individual blades of the outlet guide vanes of the compressor form nozzles of the injectors.

3. A power plant, comprising at least one compressor, at least one combustion chamber operable with at least one burner, at least one turbine acting downstream of the combustion chamber, and at least one injector system having nozzles which are operable with steam, wherein the injector system is connected to inject steam into an outlet diffuser located downstream of the compressor to further compress air directed into the outlet diffuser from the compressor, wherein the injector system comprises a ring of individual injectors arranged on an inner circumference of the outlet diffuser and the nozzles are concentric to the outlet diffuser, and wherein the outlet diffuser forms a receiving nozzle of the injector system.

* * * * *